Figure 1:
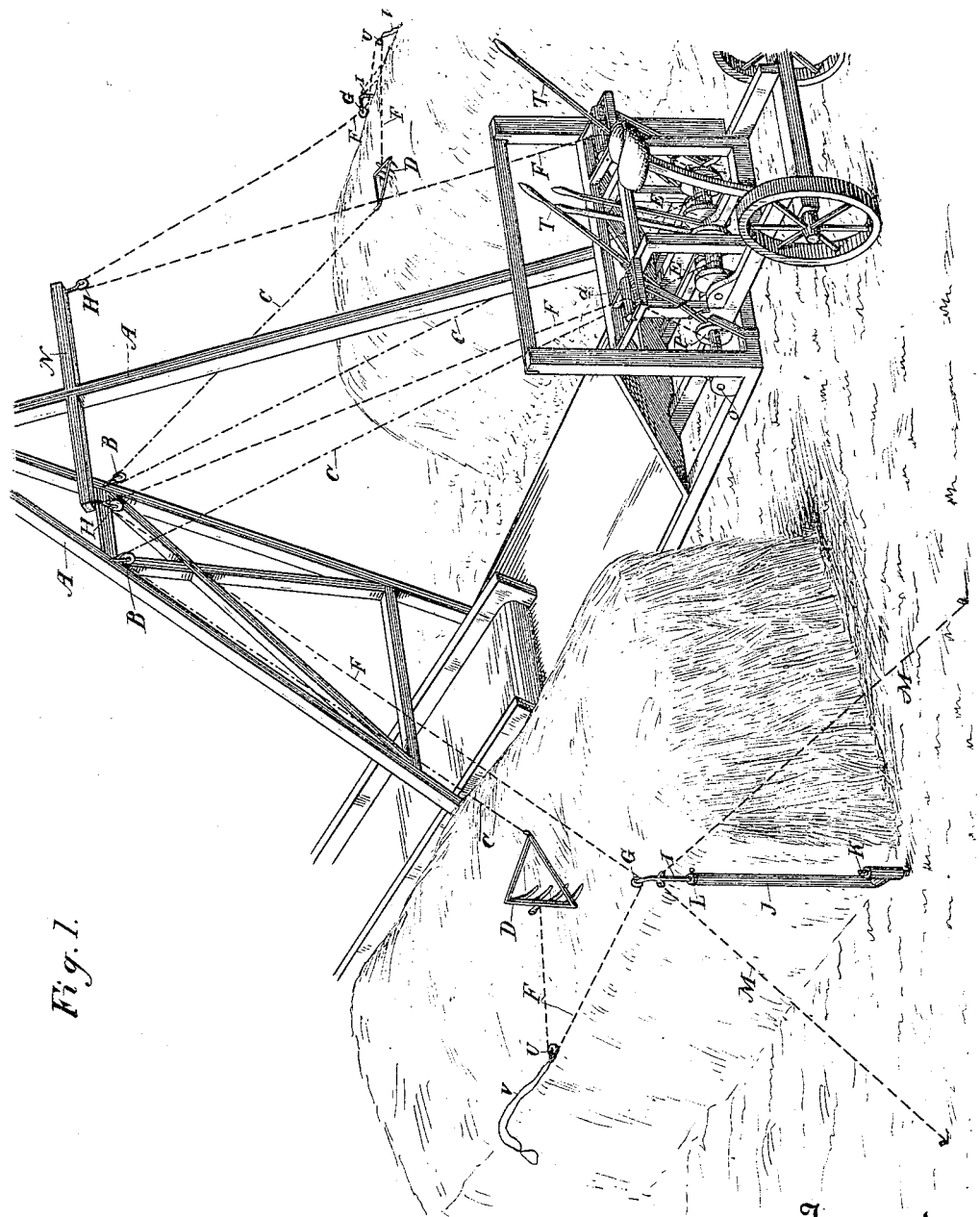

(No Model.)  2 Sheets—Sheet 1.

C. STONE.
APPARATUS FOR WORKING DERRICK FORKS.

No. 328,530.  Patented Oct. 20, 1885.

Witnesses,
Geo. H. Strong.
J. S. Tourke.

Inventor,
Cassius Stone
By
Dewey & Co.
Attorneys

N. PETERS, Photo-Lithographer, Washington, D. C.

(No Model.) 2 Sheets—Sheet 2.
C. STONE.
APPARATUS FOR WORKING DERRICK FORKS.
No. 328,530. Patented Oct. 20, 1885.
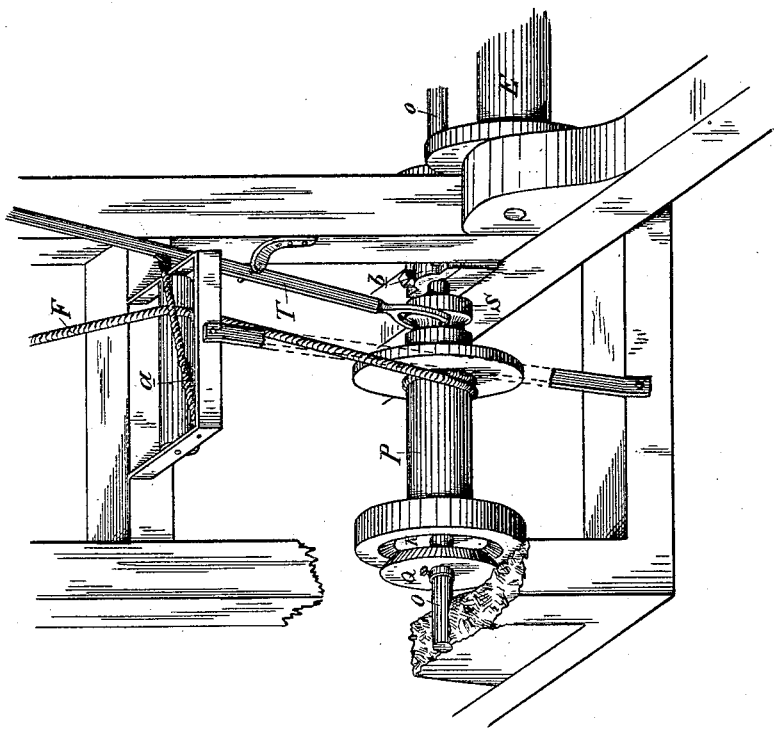
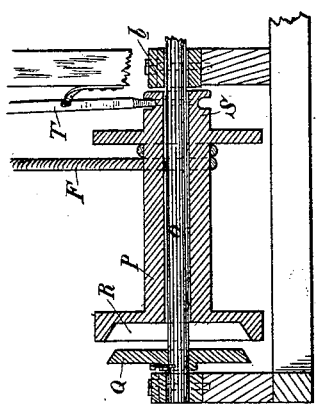
Witnesses,
Geo. H. Strong.
J. A. Nurse.
Inventor,
Cassius Stone
By Dewey & Co.
Attorneys

UNITED STATES PATENT OFFICE.

CASSIUS STONE, OF WALNUT CREEK, CALIFORNIA.

APPARATUS FOR WORKING DERRICK-FORKS.

SPECIFICATION forming part of Letters Patent No. 328,530, dated October 20, 1885.

Application filed April 1, 1885. Serial No. 160,942. (No model.)

*To all whom it may concern:*

Be it known that I, CASSIUS STONE, of Walnut Creek, Contra Costa county, State of California, have invented an Improvement in Apparatus for Working Derrick-Forks; and I hereby declare the following to be a full, clear, and exact description of the same.

My invention relates to an apparatus for working derrick-forks, by the use of which the fork, having been raised so as to discharge its load, may be again drawn back to be set for a new load.

It consists of a rope attached to the rear of the fork-head, passing around a pulley which is supported from an adjustable standard at the rear of the stack, thence over a pulley fixed near the upper part of the derrick, and thence to a winding-drum, which turns upon a clutch mechanism, and a means for operating the same, so that the drum may be caused to rotate with the shaft or allowed to remain stationary, at will.

Referring to the accompanying drawings for a more complete explanation of my invention, Figure 1 is a general view of the apparatus. Fig. 2 is a section taken through the winding-drum, showing the clutch mechanism and lever. Fig. 3 is an enlarged view of these parts.

A is a derrick-frame of the usual or any desired construction, having the pulley B fixed near the upper end, over which the rope C passes, connecting the fork D with the winding-drum E, so that when the latter is caused to rotate the fork will be raised with its load, which is afterward deposited wherever required. This apparatus is used in connection with thrashing machinery, and serves to bring the unthrashed grain and straw from the stack and deposit it upon the feed-table of the thrashing-machine.

After the load is discharged it is necessary to return the fork to the point where it is to take a new load, and this often necessitates its being dragged forty or fifty feet across the stack. My improvement is designed to accomplish this work without the expenditure of manual labor. In order to return the forks I employ ropes F, which are attached to the rear of the forks, passing over pulleys H, suspended from the derrick-frame, as shown in a former patent issued to me September 9, 1884.

In the present case the pulley G is supported upon a vertical post, I, to which it is properly attached. This post slides or telescopes within a hollow post, J, of considerable length, which is fixed at the bottom to a post or stake, K, driven firmly into the ground. The exterior hollow post, J, may be made of large-sized gas-pipe, and the interior post, I, which slides within it, may also be made of gas-pipe, having a set-screw or collar by which it is fixed at any desired point.

M are guy-ropes, the upper ends of which are fixed to the head of the post I, while the lower ends are secured to posts or stakes upon the ground, so as to steady the standard. By the use of this telescopic standard the height at which the pulley G is supported may be regulated or adjusted to suit the height of the stack upon which the work is being done.

The pulleys H are suspended from opposite ends of a cross-bar, N, which is fixed upon the derrick-frame, its ends extending upon each side, so as to separate the pulleys H and bring them in line with the respective drums upon which the ropes F are to be wound, it being usual to employ two derrick-forks, one of which may be bringing a load while the other is returning emptied. The means for raising the loaded forks does not differ materially from that shown in former patents, in which the ropes B, after passing over the pulleys B, are wound upon central drums, E, driven by suitable mechanism.

My improvement upon this apparatus consists in the shaft O, upon which the drum P is placed. This drum turns loosely upon the shaft, and does not rotate with it unless the clutch mechanism is thrown into gear. This clutch mechanism may be made of any known or desired form. In the present case it consists of a disk, Q, having its periphery made beveling or inclined to correspond with a similarly beveled or inclined recess, R, in the end of the drum P which is nearest it.

S is a hub or collar having a groove or channel made around it, into which the forks of the clutch-lever T may fit, so that when the lever is moved to one side the drum is brought in contact with the disk Q and caused to rotate, so as to wind up the rope F upon it and thus draw the fork back to any desired point.

When the clutch-lever is thrown in the opposite direction, it releases the drum P, allowing it to turn freely upon the shaft O, and the rope uncoils from it as the fork is raised with its load by the action of the drum E.

A spring, $a$, is connected with the clutch-lever, and when the latter is released the spring throws it over, causing the spool or drum to slide along the shaft and its hub or collar to come in contact with the box $b$. This causes sufficient friction to stop the revolutions of the drum and the consequent unwinding of the rope after the clutch is thrown off.

It is not always desirable to return the fork to a point which is directly in line with the pulley G. In order to give it the desired latitude and return it to points at some distance out of line with the pulley G, I employ a secondary pulley, U, which is fixed to a handle, V. The rope F runs over this pulley U, and if the operator desires to bring the fork to a point out of line with the pulley G he simply draws the return-rope F to one side by means of the handle V and pulley U, as shown in Fig. 1.

The whole apparatus is conveniently arranged, easily adjustable, and greatly reduces the labor of handling the forks.

Having thus described my invention, what I claim as new, and desire to secure by Letters Patent, is—

1. A derrick-fork-hoisting apparatus having the rope, drums, pulleys, and fork, in combination with a secondary rope attached to the rear of the fork, direction-pulleys, and a drum or operating mechanism by which these ropes may be caused to return the fork after its load is discharged, substantially as herein described.

2. In a derrick-fork-hoisting apparatus, the hoisting-ropes passing over pulleys and attached to the forks, and the drums around which the ropes are coiled, and an operating mechanism therefor, in combination with the supplemental drums, with the clutch mechanism and levers, and the ropes passing around said drums over direction-pulleys and attached to the rear of the fork, substantially as herein described.

3. In a derrick-fork-hoisting apparatus, the combination, with the derrick-frame provided with the pulleys H, the ropes F, and the forks D, of the pulleys G, vertical posts I, to which the pulleys G are attached, the hollow posts J, within which the posts I slide, and set-screws or holding devices whereby they may be adjusted, substantially as and for the purpose set forth.

4. The hoisting forks and ropes, in combination with the return-ropes and direction-pulleys, and the handle V with its pulley U, substantially as herein described.

In witness whereof I have hereunto set my hand.

CASSIUS STONE.

Witnesses.
  S. H. NOURSE,
  H. C. LEE.